US012573637B2

(12) United States Patent
Kazama et al.

(10) Patent No.: US 12,573,637 B2
(45) Date of Patent: Mar. 10, 2026

(54) NONAQUEOUS ELECTROLYTE SECONDARY BATTERY

(71) Applicant: Panasonic Intellectual Property Management Co., Ltd., Osaka (JP)

(72) Inventors: Ryo Kazama, Kanagawa (JP); Yuta Kuroda, Osaka (JP); Manabu Takijiri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 853 days.

(21) Appl. No.: 17/045,261

(22) PCT Filed: Feb. 22, 2019

(86) PCT No.: PCT/JP2019/006773
§ 371 (c)(1),
(2) Date: Oct. 5, 2020

(87) PCT Pub. No.: WO2019/198351
PCT Pub. Date: Oct. 17, 2019

(65) Prior Publication Data
US 2021/0167396 A1 Jun. 3, 2021

(30) Foreign Application Priority Data

Apr. 10, 2018 (JP) ................................. 2018-075538

(51) Int. Cl.
| | |
|---|---|
| *H01M 4/62* | (2006.01) |
| *H01M 4/02* | (2006.01) |
| *H01M 4/36* | (2006.01) |
| *H01M 4/38* | (2006.01) |
| *H01M 4/525* | (2010.01) |
| *H01M 10/0525* | (2010.01) |

(52) U.S. Cl.
CPC ........... *H01M 4/628* (2013.01); *H01M 4/364* (2013.01); *H01M 4/386* (2013.01); *H01M 4/525* (2013.01); *H01M 10/0525* (2013.01); *H01M 2004/028* (2013.01)

(58) Field of Classification Search
CPC ...... H01M 4/628; H01M 4/364; H01M 4/386; H01M 4/525; H01M 10/0525; H01M 2004/028
See application file for complete search history.

(56) References Cited

U.S. PATENT DOCUMENTS

| | | | |
|---|---|---|---|
| 2007/0141468 A1* | 6/2007 | Barker | H01M 4/364 429/231.1 |
| 2009/0081550 A1 | 3/2009 | Inoue et al. | |
| 2014/0080003 A1 | 3/2014 | Tsuji et al. | |
| 2015/0243982 A1* | 8/2015 | Hiratsuka | H01M 4/525 429/223 |
| 2015/0372304 A1 | 12/2015 | Hasegawa et al. | |
| 2016/0218394 A1* | 7/2016 | Yamada | H01M 10/052 |
| 2016/0351905 A1* | 12/2016 | Kawamura | H01M 10/0525 |
| 2017/0346070 A1* | 11/2017 | Kim | H01M 4/624 |
| 2017/0373340 A1* | 12/2017 | Fujii | H01M 4/131 |
| 2019/0103605 A1 | 4/2019 | Saitou et al. | |

FOREIGN PATENT DOCUMENTS

| | | |
|---|---|---|
| JP | 2009-76383 A | 4/2009 |
| JP | 2015-88268 A | 5/2015 |
| JP | 2017-168255 A | 9/2017 |
| WO | 2013/145721 A1 | 10/2013 |
| WO | 2014/118834 A1 | 8/2014 |
| WO | 2017/169184 A1 | 10/2017 |

OTHER PUBLICATIONS

Khanderi et al. A study of binary iron/lithium organometallic complexes as single source precursors to solid state cathode materials for potential Li ion battery application, Inorganica Chimica Acta, 370, (2011), p. 254-259 (Year: 2011).*
International Search Report dated May 21, 1019, issued in counterpart Application No. PCT/JP2019/006773, with English Translation. (3 pages).

* cited by examiner

*Primary Examiner* — Brian R Ohara
*Assistant Examiner* — Emily Elizabeth Freeman
(74) *Attorney, Agent, or Firm* — WHDA, LLP

(57) ABSTRACT

A nonaqueous electrolyte secondary battery according to an embodiment of the present disclosure comprises a positive electrode, a negative electrode, and a nonaqueous electrolyte. The positive electrode has: a positive electrode current collector; and a positive electrode active material layer that is provided to the surface of the positive electrode current collector and includes a positive electrode active material and a positive electrode additive. The positive electrode active material contains a lithium-nickel composite oxide having a compressive breaking strength of at least 130 MPa and including at least 50 mol % of nickel relative to the total quantity of metals other than lithium. The positive electrode additive contains a lithium-containing metal oxide that has an antifluorite structure.

7 Claims, No Drawings

NONAQUEOUS ELECTROLYTE SECONDARY BATTERY

TECHNICAL FIELD

The present disclosure relates to a non-aqueous electrolyte secondary battery.

BACKGROUND ART

Non-aqueous electrolyte secondary batteries are used as power sources of, for example, electric equipment, and furthermore are being increasingly used also as power sources of electric vehicles (EV, HEV, and the like). Non-aqueous electrolyte secondary batteries are demanded to be, for example, further enhanced in energy density, enhanced in output density, and enhanced in cycle characteristics.

For example, Patent Literature 1 describes a non-aqueous electrolyte secondary battery comprising: a positive electrode including a positive electrode active material including a metal oxide and a positive electrode additive including at least one or more oxides selected from lithium/copper oxide, lithium/iron oxide, and lithium/manganese oxide; a negative electrode including a negative electrode active material including a titanium-containing oxide; and a non-aqueous electrolyte.

Patent Literature 2 describes a non-aqueous electrolyte secondary battery comprising a positive electrode including a positive electrode active material made of a lithium-containing transition metal oxide having a layered crystal structure, and a negative electrode including a negative electrode active material made of Ti-based oxide and an additive made of fluorinated carbon that reacts with lithium at a higher potential than that of the negative electrode active material, in which the battery is configured so that the battery voltage reaches the discharge cutoff voltage by the change in potential of the negative electrode.

CITATION LIST

Patent Literature

PATENT LITERATURE 1: Japanese Unexamined Patent Application Publication No. 2017-168255
PATENT LITERATURE 2: International Publication WO2013/145721

SUMMARY

A non-aqueous electrolyte secondary battery has a difference in charge-discharge capacity between charge and discharge at the first cycle at an average operating voltage (for example, 2.8 V to 4.3 V vs.Li/Li$^+$) of a positive electrode for use in the battery. Such a difference in charge-discharge capacity is an irreversible capacity corresponding to the amount of lithium ions that are deintercalated from the positive electrode in charge, but are not intercalated in discharge. The ratio of the discharge capacity to the charge capacity of the positive electrode at the first cycle is referred to as the charge-discharge efficiency of the positive electrode. A non-aqueous electrolyte secondary battery which is large in irreversible capacity of a positive electrode and which is decreased in charge-discharge efficiency tends to result in positive electrode regulation at the terminal stage of discharge, where the battery voltage reaches the discharge cutoff voltage with a decrease in positive electrode potential prior to an increase in negative electrode potential. A nonaqueous electrolyte secondary battery resulting in positive electrode regulation may be rapidly decreased in positive electrode potential at the terminal stage of discharge, resulting in structure degradation of a positive electrode active material and deterioration in charge-discharge cycle characteristics.

It is an advantage of the present disclosure is to provide a non-aqueous electrolyte secondary battery which is suppressed in structure degradation of a positive electrode active material at the terminal stage of discharge in a charge-discharge cycle and which is improved in charge-discharge cycle characteristics.

A non-aqueous electrolyte secondary battery according to one aspect of the present disclosure comprises a positive electrode, a negative electrode, and a non-aqueous electrolyte, wherein the positive electrode includes a positive electrode current collector and a positive electrode active material layer which is provided on a surface of the positive electrode current collector and which includes a positive electrode active material and a positive electrode additive, the positive electrode active material includes 50 mol % or more of nickel based on a total amount of a metal other than lithium and contains a lithium/nickel complex oxide having a compressive fracture strength of 130 MPa or more, and the positive electrode additive contains a lithium-containing metal oxide having an antifluorite structure.

According to the present disclosure, there can be provided a non-aqueous electrolyte secondary battery which allows for control of an electrode regulating the cutoff of discharge at the terminal stage of discharge in a charge-discharge cycle, and which is suppressed in structure degradation of a positive electrode active material and which is improved in charge-discharge cycle characteristics.

DESCRIPTION OF EMBODIMENTS

In the prior art, a problem has been that, when the terminal stage of discharge of a battery corresponds to positive electrode regulation in a specified nickel content range of a positive electrode active material, the depth of discharge of the positive electrode active material is increased, no particle structure is kept, and durability is deteriorated. For example, Patent Literature 2 proposes a solution for an improvement in battery durability, in which negative electrode regulation where the battery voltage reaches the discharge cutoff voltage with an increase in negative electrode potential prior to a decrease in positive electrode potential can be adopted to thereby suppress the change in crystal structure according to insertion/elimination of lithium in a region at the terminal stage of discharge, in which the single electrode potential of a positive electrode active material having a layered crystal structure is significantly changed. On the other hand, such negative electrode regulation causes remarkable consumption of lithium as an active material due to a side reaction such as covering (SEI) formation on a negative electrode surface, resulting in deterioration in cycle characteristics.

The present inventors have made intensive studies, and as a result, have found that battery durability is drastically improved by a synergistic effect of control of an electrode regulating the cutoff of discharge of a battery and stabilization of a particle structure at the terminal stage of discharge of a positive electrode, the effect being exerted by combination use of a positive electrode additive containing a lithium-containing metal oxide having an antifluorite structure with a positive electrode active material including 50 mol % or more of nickel based on the total amount of a metal other than lithium and containing a lithium/nickel complex oxide having a compressive fracture strength of 130 MPa or more. The effect is not sufficiently obtained by only use of a lithium-containing metal oxide having an antifluorite structure in a positive electrode additive because the particle boundary of the positive electrode active material is unstable and a particle structure cannot be kept. Alternatively, the effect is not sufficiently obtained by only a lithium/nickel complex oxide having a compressive fracture strength of 130 MPa or more because an electrode dominating the capacity of a battery easily results in negative electrode regulation due to consumption of lithium on a negative electrode.

Hereinafter, embodiments of a non-aqueous electrolyte secondary battery of one aspect of the present disclosure will be described. Embodiments described below are illustrative, and the present disclosure is not limited thereto.

<Non-Aqueous Electrolyte Secondary Battery>

A non-aqueous electrolyte secondary battery of an exemplary embodiment comprises a positive electrode, a negative electrode, a non-aqueous electrolyte, a separator, and a battery case. Specifically, the battery has a structure in which a wound-type electrode assembly formed by winding a positive electrode and a negative electrode with a separator being interposed therebetween, and a non-aqueous electrolyte are housed in a battery case. The electrode assembly is not limited to a wound-type electrode assembly, and another form of electrode assembly, for example, a stacked electrode assembly formed by stacking a positive electrode and a negative electrode with a separator being interposed therebetween may be applied.

Examples of such a battery case housing the electrode assembly and the non-aqueous electrolyte can include a cylindrical, rectangular, coin-shaped, or button-shaped metal case, and a resin case (laminated battery) obtained by forming a sheet obtained by laminating metal foil by a resin sheet.

Hereinafter, a positive electrode, a negative electrode, a non-aqueous electrolyte, and a separator for use in a non-aqueous electrolyte secondary battery of an exemplary embodiment will be described in detail.

<Positive Electrode>

The positive electrode is configured from, for example, a positive electrode current collector of metal foil or the like, and a positive electrode active material layer which is provided on the positive electrode current collector and which includes a positive electrode active material and a positive electrode additive. The positive electrode current collector here used can be, for example, foil of a metal, such as aluminum, which is stable in the electric potential range of the positive electrode, or a film in which such a metal is disposed on an outer layer.

The positive electrode active material included in the positive electrode active material layer includes 50 mol % or more of nickel based on the total amount of a metal other than lithium, and contains a lithium/nickel complex oxide having a compressive fracture strength of 130 MPa or more (hereinafter, also designated as "LiNi complex oxide"). A lithium-containing metal oxide having an antifluorite structure (hereinafter, also designated as "Li-containing oxide") is contained as the positive electrode additive included in the positive electrode active material layer. The positive electrode active material layer suitably further includes a conductive agent and a binder.

The positive electrode can be produced by, for example, coating a surface of a positive electrode current collector with a positive electrode mixture slurry including a positive electrode active material, a positive electrode additive, a conductive agent, a binder, and the like, drying the resultant coating to thereby form the positive electrode active material layer on the surface of the positive electrode current collector, and then rolling the positive electrode active material layer. The thickness of the positive electrode current collector is not particularly limited, and is, for example, about 10 μm or more and 100 μm or less.

[Positive Electrode Active Material]

The positive electrode active material for use in the non-aqueous electrolyte secondary battery according to the present embodiment includes a LiNi complex oxide including 50 mol % or more of nickel based on the total amount of lithium and a metal other than lithium, as a main component. The "including as a main component" means that the content of a first complex oxide based on the total amount of the positive electrode active material is, for example, 90 mass % or more, preferably 99 mass % or more.

The LiNi complex oxide includes at least lithium (Li) and nickel (Ni). The content of lithium in the complex oxide is, for example, preferably 90 mol % or more and 120 mol % or less based on the total amount of a metal other than lithium. The reason is because the complex oxide can contain lithium in such a range to result in an enhancement in charge-discharge capacity of the non-aqueous electrolyte secondary battery.

The LiNi complex oxide contains 50 mol % or more of nickel based on the total amount of a metal other than lithium, as described above. The LiNi complex oxide can contain nickel in such a range to thereby suppress an increase in negative electrode potential at the terminal stage of discharge, resulting in not only an enhancement in durability of the negative electrode, but also an enhancement in capacity. The LiNi complex oxide preferably contains 80 mol % or more of nickel, preferably contains 85 mol % or more of nickel based on the total amount of a metal other than lithium from such a viewpoint and from the viewpoint that a low charge-discharge efficiency at the first cycle easily leads to positive electrode regulation and the effect of suppressing deterioration in cycle characteristics due to the present embodiment is highly exerted. The upper limit of the content of nickel is not particularly limited, and the LiNi complex oxide preferably contains 95 mol % or less of nickel based on the total amount of a metal other than lithium from the viewpoint of thermal stability.

The LiNi complex oxide can be represented by, for example, general formula $Li_aNi_xM_{1-x}O_2$. In the formula, M represents any metal element other than lithium and nickel, and a and x satisfy $0.9 \leq a \leq 1.2$ and $0.5 \leq x \leq 1$, respectively.

Examples of the metal element M in the general formula include at least one or more metal elements selected from a transition metal element other than Ni, an alkali earth metal element, and Group 12 to Group 14 elements. Specific examples of the metal element M include cobalt (Co), aluminum (Al), manganese (Mn), magnesium (Mg), calcium (Ca), chromium (Cr), zirconium (Zr), molybdenum (Mo), silicon (Si), titanium (Ti), iron (Fe), boron (B), copper (Cu), zinc (Zn), tin (Sn), barium (Ba), and strontium (Sr). Preferable metal elements M in the general formula are cobalt, aluminum, and manganese.

The LiNi complex oxide preferably contains cobalt, for example, more preferably contains 3 mol % or more and 15 mol % or less of cobalt based on the total amount of metals other than lithium (Ni and M in the general formula) from the viewpoint of the durability of the non-aqueous electrolyte secondary battery.

The LiNi complex oxide preferably contains aluminum, for example, preferably contains 1 mol % or more and 5 mol % or less of aluminum based on the total amount of metals other than lithium (Ni and M in the general formula). The LiNi complex oxide contains aluminum, thereby enabling the durability of the non-aqueous electrolyte secondary battery to be more enhanced. The LiNi complex oxide contains 5 mol % or less of aluminum, thereby enabling the charge-discharge capacity of the non-aqueous electrolyte secondary battery to be more enhanced.

The LiNi complex oxide represented by the general formula is not necessarily limited to any LiNi complex oxide where the molar ratio of the total amount of nickel and the metal element M, and the amount of an oxygen atom is strictly 1:2. For example, even a LiNi complex oxide where the molar ratio is 1:1.9 or more and 1:2.1 or less can also be utilized to be encompassed in the LiNi complex oxide represented by the general formula.

The respective compositions of the LiNi complex oxide included in the positive electrode active material and a Li-containing oxide included in the positive electrode additive, described below, can be measured with, for example, an ICP emission spectrometric analysis apparatus (for example, trade name "iCAP6300" manufactured by Thermo Fisher Scientific Inc.).

The positive electrode active material for use in the non-aqueous electrolyte secondary battery according to the present embodiment corresponds to particles having a compressive fracture strength of 130 MPa or more. The compressive fracture strength (St) is the measure evaluating the hardness of the positive electrode active material, and is calculated by the numerical expression $St=2.8P/(\pi d^2)$ (wherein P represents the load applied to the particles and d represents the particle size) described in "Journal of the Mining and Metallurgical Institute of Japan" vol. 81, No. 932, December 1965 issue, pages 1024 to 1030. The compressive fracture strength is determined by dividing by the square of the particle size and thus highly depends on the particle size, and consequently the compressive fracture strength is higher as the particles are smaller. Therefore, the compressive fracture strength is preferably defined as the compressive fracture strength at a predetermined particle size. The compressive fracture strength of the positive electrode active material can be measured with, for example, a micro compression testing machine (model name "MCT-W201" manufactured by Shimadzu Corporation).

The compressive fracture strength of the positive electrode active material, in the case of a particle size defined as about 8 μm, is preferably 130 MPa or more. The "particle size being about 8 μm" means that, for example, the particle size is within the range of 8 μm±5%. In the present embodiment, the compressive fracture strength of the positive electrode active material is 130 MPa or more, and thus the structure of the positive electrode active material can be stronger to thereby suppress structure degradation at the terminal stage of discharge. As a result, the non-aqueous electrolyte secondary battery according to the present embodiment can be suppressed in deterioration in capacity in a long-term cycle and improved in cycle characteristics.

The compressive fracture strength of the positive electrode active material is preferably 230 MPa or less, more preferably 200 MPa or less. When the compressive fracture strength is in the range, the metal foil serving as the positive electrode current collector can be inhibited from being damaged by rolling in production of the positive electrode.

Such a positive electrode active material having a compressive fracture strength in the range can be produced by, for example, allowing the positive electrode active material to contain silicon. More specifically, the positive electrode active material can be synthesized according to the following method. First, a lithium-containing compound, a compound containing nickel and the metal element represented by M in the general formula, and a silicon-containing compound are mixed at a mixing ratio based on an objective LiNi complex oxide. Examples of the lithium-containing compound include hydroxide, chloride, nitrate salt, and carbonate salt of lithium. Examples of the compound containing nickel and the metal element represented by M in the general formula include oxides, hydroxides, chlorides, nitrate salts, carbonate salts, sulfate salts, and salts of organic acids. Examples of the silicon-containing compound include silicon monoxide (SiO) and silicon dioxide ($SiO_2$). Then, the resulting mixture can be fired to thereby synthesize a LiNi complex oxide containing silicon. The mixture is fired in the air or in an oxygen stream. The firing temperature is about 600 to 1100° C., and the firing time is about 1 to 10 hours when the firing temperature is 600 to 1100° C.

The LiNi complex oxide thus synthesized is considered to be in the form of a solid solution of silicon with other metal element. Silicon contained in the positive electrode active material may be in any form, and is preferably in the form of a solid solution with the LiNi complex oxide. When silicon is in the form of a solid solution with the LiNi complex oxide, a bond of silicon and oxygen can be strengthened and a crystal lattice can be more strengthened, resulting in an enhancement in compressive fracture strength of the positive electrode active material. The LiNi complex oxide in the form of a solid solution with silicon corresponds to a compound represented by the general formula $Li_xNi_yM_zO_2$, wherein M includes silicon.

The positive electrode active material containing silicon may be formed from secondary particles with primary particles aggregated and may contain a silicon compound at a joining portion (particle boundary) between primary particles. Examples of the silicon compound here include silicon oxide such as $SiO_2$ and SiO, and lithium silicate which is an oxide of lithium and silicon.

The content of silicon included in the positive electrode active material may be appropriately adjusted so that the compressive fracture strength of the positive electrode active material is in the range. The content of silicon is preferably 0.1 mol % or more, more preferably 0.5 mol % or more based on the total amount of a metal element other than lithium included in the LiNi complex oxide constituting the positive electrode active material from the viewpoint of an enhancement in compressive fracture strength of the positive electrode active material. The content of silicon is preferably 5 mol % or less, more preferably 3 mol % or less based on the total amount of a metal element other than lithium from the viewpoint of suppression of damage of the positive electrode current collector and from the viewpoint of stability of the crystal structure of the positive electrode active material.

The method for producing such a positive electrode active material having a compressive fracture strength in the range is not limited to the method involving allowing the positive electrode active material to contain silicon.

The volume average particle size of the secondary particles of the positive electrode active material is, for example, 1 μm or more and 50 μm or less, preferably 5 μm or more and 20 μm or less. The volume average particle size means a particle size which is the volume average particle size of the positive electrode active material, measured according to a laser diffraction scattering method, and in which the volume cumulative value in a particle size distribution is 50%. The volume average particle size of the positive electrode active material can be measured with, for example, a laser diffraction scattering particle size distribution measuring apparatus (manufactured by HORIBA, Ltd.).

[Positive Electrode Additive]

A positive electrode additive formed by a Li-containing oxide having an antifluorite structure is also used in combination with the positive electrode active material in the positive electrode, in the non-aqueous electrolyte secondary battery according to the present embodiment. Thus, an increase in negative electrode potential at the terminal stage of discharge can be suppressed and the durability of the negative electrode can be enhanced. The antifluorite crystal structure is a crystal structure in which cations having a positive charge enter the tetrahedron sites of a face-centered cubic lattice formed by anions having a negative charge. That is, such a structure is formed by four anions per unit lattice, and at most eight cation atoms can enter the sites. Examples of the antifluorite structure include a crystal structure belonging to the space group Fm3m.

Examples of the Li-containing oxide include $Li_2O$ whose anion is mainly formed by an oxygen atom and whose cation is mainly formed by lithium, and a Li-containing oxide whose anion is mainly formed by an oxygen atom and whose cation includes, for example, lithium and at least one transition metal element. Such a Li-containing oxide formed by, for example, lithium and at least one transition metal element is, for example, an oxide represented by general formula $Li_bMe_yO_4$, wherein $4 \leq b \leq 7$ and $0.5 \leq y \leq 1.5$ are satisfied, and Me represents at least one transition metal selected from Co, Fe, Mn, Zn, Al, Ga, Ge, Ti, Si, and Sn.

The positive electrode additive having an antifluorite structure deintercalates lithium in charge and intercalates lithium in discharge, and thus the compositional ratio of lithium in the Li-containing oxide is changed. In the case of a Li-containing oxide containing, for example, a transition metal element other than lithium, the oxidation number of the transition metal element is changed according to the law of charge neutrality, and increase/decrease of charge due to intercalation/deintercalation of Li is compensated. The Li-containing oxide preferably includes at least one selected from the group consisting of lithium/iron oxide, lithium/copper oxide, and lithium/manganese oxide from the viewpoint of the above charge compensation and from the viewpoint of, for example, easiness of synthesis of the positive electrode additive and a relatively light weight.

Examples of the lithium/iron oxide include one or more oxides selected from the group consisting of $Li_5FeO_4$, $LiFeO_2$, $LiFe_5O_8$, $Li_3Fe_5O_8$, $Li_2Fe_3O_4$, $Li_5Fe_5O_8$, and $Li_2Fe_3O_5$. Examples of the lithium/copper oxide include one or more oxides selected from the group consisting of $Li_2CuO_2$, $LiCuO$, $Li_6CuO_4$, $Li_2Cu_2O_3$, $LiCu_3O_3$, $LiCu_2O_2$, $LiCuO_2$, $Li_3Cu_2O_4$, $Li_3CuO_3$, and $LiCu_3O_3$. Examples of the lithium/manganese oxide include one or more oxides selected from the group consisting of $LiMnO_2$, $Li_2MnO_3$, $Li_3MnO_4$, $LiMn_3O_4$, $Li_4Mn_5O_{12}$, and $LiMnO_4$. In particular, the Li-containing oxide is preferably lithium/iron oxide, particularly preferably $Li_5FeO_4$ from the viewpoint of stability and solubility in the first charge.

The Li-containing oxide for use as the positive electrode additive can be synthesized, for example, in the same manner as in the above method for synthesizing the LiNi complex oxide. More specifically, first, a lithium-containing compound, and a compound containing a transition metal element represented by Me in the general formula are mixed at a mixing ratio based on an objective Li-containing oxide. Examples of the lithium-containing compound include hydroxide, chloride, nitrate salt, and carbonate salt of lithium. Examples of the compound containing a transition metal element represented by Me in the general formula include oxide, hydroxides, chlorides, nitrate salts, carbonate salts, sulfate salts, and salts of organic acids. Then, the resulting mixture can be fired to thereby synthesize a Li-containing oxide containing lithium and at least one transition element and having an antifluorite structure. The mixture is fired in the air or in an oxygen stream. The firing temperature is about 600 to 1100° C., and the firing time is about 1 to 10 hours when the firing temperature is 600 to 1100° C.

The content of the positive electrode additive in the positive electrode active material layer is preferably 0.1 mass % or more, more preferably 0.5 mass % or more based on the total amount of the positive electrode active material layer (positive electrode active material, positive electrode additive, conductive agent, and binder) because an increase in negative electrode potential at the terminal stage of discharge can be more suppressed. The content of the positive electrode additive in the positive electrode active material layer is preferably 10 mass % or less, more preferably 5 mass % or less based on the total amount of the positive electrode active material layer because the capacity of the battery is ensured and the energy density is kept high.

The presence of the positive electrode additive having an antifluorite structure in the positive electrode active material layer can be analyzed according to a known method based on a powder X-ray diffraction method. For example, in the case of $Li_5FeO_4$, the presence of the positive electrode additive having an antifluorite structure can be confirmed by detecting the diffraction peak of the (121) plane of the antifluorite structure, appearing near a diffraction angle (2θ) of 23.7° in an X-ray diffraction pattern.

[Conductive Agent]

Examples of the conductive agent included in the positive electrode active material layer include carbon materials such as carbon black, acetylene black, Ketjenblack, and graphite. These may be used singly or in combinations of two or more thereof. The content of the conductive agent may be, for example, 0.1 mass % or more and 20 mass % or less and is preferably 0.1 mass % or more and 10 mass % or less based on the total amount of the positive electrode active material layer (positive electrode active material, positive electrode additive, conductive agent, and binder).

[Binder]

Examples of the binder included in the positive electrode active material layer include fluoro resins such as polytetrafluoroethylene (PTFE) and poly(vinylidene fluoride) (PVdF), polyacrylonitrile (PAN), polyimide resins, acrylic resins, and polyolefin resins. Such binders may be used singly or in combinations of two or more thereof. Such binders may also be each used in combination with, for example, carboxymethyl cellulose (CMC) or a salt thereof (which may be, for example, CMC—Na, CMC—K, CMC—NH₄, or a partially neutralized salt), or polyethylene oxide (PEO). The content of the binder may be, for example, 0.1 mass % or more and 20 mass % or less and is preferably 0.1 mass % or more and 10 mass % or less based on the total amount of the positive electrode active material layer (positive electrode active material, positive electrode additive, conductive agent, and binder).

<Negative Electrode>

The negative electrode comprises, for example, a negative electrode current collector of metal foil or the like, and a negative electrode active material layer formed on a surface of the negative electrode current collector. The negative electrode current collector here used can be, foil of a metal, such as copper, which is stable in the electric potential range of the negative electrode, or a film in which a metal, such as copper, which is stable in the electric potential of the negative electrode, is disposed on an outer layer. The negative electrode active material layer suitably includes not only a negative electrode active material that can intercalate and eliminate lithium ions, but also the binder. The binder may be used in combination with a thickener.

The negative electrode can be produced by, for example, coating the negative electrode current collector with a negative electrode mixture slurry including, for example, a negative electrode active material, a binder, and a thickener, drying the resultant coating, and then rolling the coating to thereby form the negative electrode active material layer on each of both sides of the current collector. The thickness of the negative electrode current collector is preferably 5 μm or more and 40 μm or less, more preferably 10 μm or more and 20 μm or less from the viewpoint of, for example, current collecting properties and mechanical strength.

The negative electrode active material here used can be any of, for example, natural graphite, artificial graphite, lithium, silicon, carbon, tin, germanium, aluminum, lead, indium, gallium, a lithium alloy, carbon and silicon which intercalate lithium in advance, and an alloy and mixture thereof.

The binder here used may be, for example, a fluoropolymer or a rubber polymer as in the case of the positive electrode, or may be, for example, a styrene-butadiene copolymer (SBR) or a modified product thereof. Examples of the thickener include carboxymethyl cellulose (CMC) or polyethylene oxide (PEO). These may be used singly or in combinations of two or more thereof <Non-Aqueous Electrolyte>

The non-aqueous electrolyte includes a non-aqueous solvent and an electrolyte salt dissolved in the non-aqueous solvent.

The electrolyte salt is preferably a lithium salt. The lithium salt here used can be any salt commonly used as a support salt in a conventional non-aqueous electrolyte secondary battery. Examples include $LiBF_4$, $LiClO_4$, $LiPF_6$, $LiAsF_6$, $LiSbF_6$, $LiAlCl_4$, LiSCN, $LiCF_3SO_3$, $LiC(C_2F_5SO_2)_3$, $LiCF_3CO_2$, $Li(P(C_2O_4)F_4)$, $Li(P(C_2O_4)F_2)$, $LiPF_{6-x}(C_nF_{2n+1})_x$ ($1 \leq x \leq 6$, n is 1 or 2), $LiB_{10}Cl_{10}$, LiCl, LiBr, LiI, chloroborane lithium, lithium lower aliphatic carboxylate, borate salts such as $Li_2B_4O_7$, $Li(B(C_2O_4)_2)$ [lithium-bis(oxalato)borate (LiBOB)], and $Li(B(C_2O_4)F_2)$, $LiN(FSO_2)_2$, imide salts such as $LiN(C_1F_{2l+1}SO_2)(C_mF_{2m+1}SO_2)$ {where 1 and m are integers of 0 or more}, and $Li_xP_yO_zF_\alpha$ (x is an integer of 1 to 4, y is 1 or 2, z is an integer of 1 to 8, and a is an integer of 1 to 4). Among these, for example, $LiPF_6$ or $Li_xP_yO_zF_\alpha$ (x is an integer of 1 to 4, y is 1 or 2, z is an integer of 1 to 8, and a is an integer of 1 to 4) is preferable. Examples of $Li_xP_yO_zF_\alpha$ include lithium monofluorophosphate and lithium difluorophosphate. These lithium salts may be used singly or a plurality thereof may be mixed and used.

Examples of the non-aqueous solvent for use in the non-aqueous electrolyte can include cyclic carbonates, chain carbonates, and carboxylate esters. Specific examples include cyclic carbonates such as ethylene carbonate (EC), propylene carbonate (PC), butylene carbonate, and vinylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; chain carboxylate esters such as methyl propionate (MP), ethyl propionate, methyl acetate, ethyl acetate, and propyl acetate; and cyclic carboxylate esters such as γ-butyrolactone (GBL) and γ-valerolactone (GVL).

Other examples of the non-aqueous solvent for use in the non-aqueous electrolyte can include ethers, nitriles, and amides such as dimethylformamide. Examples of the cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers.

Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzylethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

The non-aqueous electrolyte may include a halogen-substituted product. Examples of the halogen-substituted product include fluorinated cyclic carbonate esters such as 4-fluoroethylene carbonate (FEC), fluorinated chain carbonate esters, and fluorinated chain carboxylate esters such as methyl 3,3,3-trifluoropropionate (FMP).

<Separator>

For example, an ion-permeable and insulating porous sheet is used as the separator. Specific examples of the porous sheet include a microporous thin film, woven fabric, and nonwoven fabric. The material for the separator is, for example, suitably an olefin resin such as polyethylene or polypropylene, or cellulose. The separator may be a laminate including a cellulose fiber layer and a layer of fibers of a thermoplastic resin such as an olefin resin. The separator may be a multi-layered separator including a polyethylene layer and a polypropylene layer, and a surface of a separator to be used may be coated with a resin such as an aramid resin.

EXAMPLES

Hereinafter, the present disclosure will be more specifically described with reference to Examples and Comparative Examples, but the present disclosure is not intended to be limited to the following Examples.

Example 1

[Production of Positive Electrode Active Material]

$NiSO_4$, $CoSO_4$, and $Al_2(SO_4)_3$ were mixed and coprecipitated in an aqueous solution, to thereby obtain a nickel cobalt aluminum complex hydroxide represented by compositional formula $Ni_{0.88}Co_{0.09}Al_{0.03}(OH)_2$. The resultant was fired to thereby produce a nickel/cobalt/aluminum complex oxide. Next, the complex oxide and lithium carbonate were mixed using a stone mill mortar. The mixing ratio (molar ratio) of lithium and metals other than lithium (Ni, Co, Al) in the mixture was 1.03:1.0. To the mixture was added SiO in an amount so that the amount of Si relative to the metals other than lithium (Ni, Co, Al) was 1 mol %. The mixture was fired in the air at 900° C. for 10 hours, and then pulverized, to thereby produce positive electrode active material a1 including LiNi complex oxide containing Si.

Positive electrode active material a1 was subjected to elemental analysis according to an ICP emission spectrometry method with an ICP emission spectrometric analysis apparatus (trade name "iCAP6300" manufactured by Thermo Fisher Scientific Inc.), and positive electrode active material a1 was found to be formed by a LiNi complex oxide represented by compositional formula $Li_{1.03}Ni_{0.88}Co_{0.09}Al_{0.03}Si_{0.005}O_2$. In other words, positive electrode active material a1 contained 0.5 mol % of Si relative to metals other than lithium (Ni, Co, Al) constituting the LiNi complex oxide in the total amount of positive electrode active material a1. Positive electrode active material a1 had a volume average particle size of 12 μm, as measured with a laser diffraction scattering particle size distribution measuring apparatus (manufactured by HORIBA, Ltd.).

The compressive fracture strength (St) of positive electrode active material a1 was measured. The compressive fracture strength was measured by subjecting five of such positive electrode active materials a1 having a particle size of about 8 (within 8 μm±5%) to the measurement in the following measurement conditions, and the average of the resulting measurement values was defined as the compressive fracture strength of positive electrode active material a1. As a result of the measurement, positive electrode active material a1 had a compressive fracture strength of 130 MPa.

<Measurement Conditions>

Test temperature: ordinary temperature (25° C.)

Test apparatus: micro compression testing machine, model name "MCT-W201" manufactured by Shimadzu Corporation Upper pressure indenter: flat surface having a diameter of 50 μm Measurement mode: compression test Test load: 90 mN Speed of load: 2.6478 mN/sec

[Production of Positive Electrode Additive]

Lithium carbonate and an oxide represented by $Fe_2O_3$ were mixed by a stone mill mortar so that the molar ratio of Li and a metal element (Fe) other than Li was 5:1. The mixture was subjected to a heat treatment in a nitrogen atmosphere at 600° C. for 12 hours, and then pulverized, to thereby produce positive electrode additive b1 including a Li-containing oxide.

Positive electrode additive b1 was subjected to elemental analysis in the same manner as in positive electrode active material a1, and was found to be formed by a Li-containing oxide represented by compositional formula $Li_5FeO_4$. Positive electrode additive b1 had a volume average particle size of 10 μm, as measured with a laser diffraction scattering particle size distribution measuring apparatus (manufactured by HORIBA, Ltd.). The crystal structure of positive electrode additive b1 was analyzed according to a powder X-ray diffraction method with a powder X-ray diffraction apparatus (trade name "RINT2200", radiation source Cu-Kα, manufactured by Rigaku Corporation). The measurement was made in measurement conditions of a 2θ/θ continuous scanning system and a rate of 4° per minute by 0.02 steps from 15° to 120°. The voltage/current in the measurement was 40 kV/40 mA, the divergence slit was 1°, the scattering slit was 1°, the light receiving slit was 0.3 mm, and no monochromatic light receiving slit was used. As a result of analysis, the crystal structure of positive electrode additive b1 was an antifluorite structure belonging to the space group Fm3m.

[Production of Positive Electrode]

After positive electrode active material a1 and positive electrode additive b1 were mixed at a mass ratio of 100:1.5, such a positive electrode active material mixed, carbon black, and poly(vinylidene fluoride) (PVDF) were mixed at a mass ratio of 100:1:1. To the mixture was added N-methyl-2-pyrrolidone (NMP) as a dispersing medium, and the resultant was kneaded to thereby prepare a positive electrode mixture slurry. Next, each surface of aluminum foil as a positive electrode current collector was coated with the positive electrode mixture slurry, the resultant coating was dried, and then rolled by a roller. Thus, a positive electrode was produced in which aluminum foil was formed on each of both sides of the positive electrode active material layer.

[Production of Negative Electrode]

Graphite, carboxymethyl cellulose (CMC), and styrene-butadiene rubber (SBR) were mixed at a mass ratio of 100:1:1, and water was added thereto. The mixture was stirred with a mixing machine (T. K. Hivis Mix manufactured by PRIMIX Corporation), to thereby prepare a negative electrode mixture slurry. Next, each surface of copper foil as a negative electrode current collector was coated with the negative electrode mixture slurry, the resultant coating was dried, and then rolled by a roller. Thus, a negative electrode was produced in which copper foil was formed on each of both sides of the negative electrode active material layer.

[Preparation of Non-Aqueous Electrolyte]

Ethylene carbonate (EC), methyl ethyl carbonate (MEC), and dimethyl carbonate (DMC) were mixed at a volume ratio of 30:30:40 (room temperature). $LiPF_6$ was dissolved in such a mixed solvent, in an amount so as to be at a concentration of 1.3 mol/L in a non-aqueous electrolyte after preparation, and furthermore vinylene carbonate was dissolved therein at a concentration of 0.3 mass % in the non-aqueous electrolyte after preparation, to thereby prepare a non-aqueous electrolyte.

[Production of Battery]

After the positive electrode and the negative electrode were cut to respective predetermined dimensions, an aluminum lead and a nickel lead were attached to the positive electrode and the negative electrode, respectively. A microporous film made of polyethylene was used as a separator, and the positive electrode and the negative electrode were spirally wound with the separator being interposed therebetween, to thereby produce a wound-type electrode assembly. The electrode assembly was housed in a cylindrical battery case body having a closed-end and having an outer size of 18 mm and a height of 65 mm, the non-aqueous electrolyte was injected, and then the opening of the battery case body was sealed by a gasket and a sealing assembly, to thereby produce a 18650 cylindrical non-aqueous electrolyte secondary battery. The battery is referred to as battery A1 of Example 1.

Comparative Example 1

First Ni—Co—Al complex oxide a2 (positive electrode active material) containing no Si was produced in the same manner as the method for producing positive electrode active material a1 of Example 1 except that no SiO was added to the mixture of nickel/cobalt/aluminum complex oxide and lithium carbonate. Positive electrode active material a2 was subjected to elemental analysis according to an ICP emission spectrometry method, and was thus found to be formed by a LiNi complex oxide represented by compositional formula $Li_{1.1}Ni_{0.88}Co_{0.09}Al_{0.03}O_2$. Positive electrode active material a2 had a volume average particle size of 11 um, as measured with a laser diffraction scattering particle size distribution measuring apparatus (manufactured by HORIBA, Ltd.). Positive electrode active material a2 had a compressive fracture strength (St) of 110 MPa.

A cylindrical non-aqueous electrolyte secondary battery (battery B1) was produced in the same manner as in Example 1 except that the mixture obtained by mixing positive electrode active material a2, carbon black, and poly(vinylidene fluoride) (PVDF) at a mass ratio of 100:1:1 was used and no positive electrode additive b1 was used in production of the positive electrode.

Comparative Example 2

A cylindrical non-aqueous electrolyte secondary battery (battery B2) was produced in the same manner as in Example 1 except that positive electrode active material a2 was used instead of positive electrode active material a1 in production of the positive electrode.

Comparative Example 3

A cylindrical non-aqueous electrolyte secondary battery (battery B3) was produced in the same manner as in Example 1 except that the mixture obtained by mixing positive electrode active material a1, carbon black, and poly(vinylidene fluoride) (PVDF) at a mass ratio of 100:1:1 was used and no positive electrode additive b1 was used in production of the positive electrode.

[Test of Cycle Characteristics]

Battery A1 produced in Example 1 and batteries B1 to B3 produced in Comparative Examples 1 to 3 were each used and subjected to charge and discharge once at a charge-discharge current of 1 It (1 It corresponded to a current value for discharging the battery capacity in 1 hour, and 1 It was here 3000 mA), a charge cutoff voltage of 4.1 V, and a discharge cutoff voltage of 3 V in a temperature condition of 25° C. The discharge capacity at the first cycle discharge was measured. Then, a charge-discharge cycle test at a charge-discharge current of 1 It, a charge cutoff voltage of 4.1 V, and a discharge cutoff voltage of 3 V in a temperature condition of 25° C. was performed fifty times, and the discharge capacity at the 50th cycle discharge was measured.

The rate of capacity degradation, as the ratio of the discharge capacity at the $50^{th}$ cycle to the discharge capacity at the $1^{st}$ cycle was calculated with respect to battery A1 of Example 1, and batteries B1 to B3 of Comparative Examples 1 to 3. The rate of capacity degradation after fifty cycles, of battery B1 of Comparative Example 1, was defined as the reference (100%), and the rates of capacity degradation after fifty cycles, of battery A1 of Example 1 and batteries B2 to B3 of Comparative Example 2 to 3, were calculated. The results are shown in Table 1.

TABLE 1

| | Content rate of Ni in LiNi complex oxide [mol %] | Compressive fracture strength of positive electrode active material [MPa] | Content rate of positive electrode additive [mass %] | Rate of capacity degradation after fifty charge-discharge cycles [%] |
|---|---|---|---|---|
| Example 1 | 88 | 130 | 1.5 | 70 |
| Comparative Example 1 | 88 | 110 | 0 | 100 (reference) |
| Comparative Example 2 | 88 | 110 | 1.5 | 148 |

TABLE 1-continued

| | Content rate of Ni in LiNi complex oxide [mol %] | Compressive fracture strength of positive electrode active material [MPa] | Content rate of positive electrode additive [mass %] | Rate of capacity degradation after fifty charge-discharge cycles [%] |
|---|---|---|---|---|
| Comparative Example 3 | 88 | 130 | 0 | 107 |

As clear from the results in Table 1, the effect of improving charge-discharge cycle characteristics was not found in battery B2 of Comparative Example 2, which included a second complex oxide having an antifluorite structure in the positive electrode active material layer, and battery B3 of Comparative Example 3, which was enhanced in compressive fracture strength of the positive electrode active material, as compared with battery B1 of Comparative Example 1. On the contrary, it was indicated that the rate of capacity degradation was reduced and charge-discharge cycle characteristics were remarkably enhanced in battery A1 of Example 1, which included a second complex oxide having an antifluorite structure in the positive electrode active material layer and which was enhanced in compressive fracture strength of the positive electrode active material, as compared with battery B1 of Comparative Example 1.

The invention claimed is:

1. A non-aqueous electrolyte secondary battery comprising:
   a positive electrode;
   a negative electrode; and
   a non-aqueous electrolyte; wherein
   the positive electrode includes a positive electrode current collector and a positive electrode active material layer which is provided on a surface of the positive electrode current collector and which includes a positive electrode active material and a positive electrode additive,
   the positive electrode active material includes 50 mol % or more of nickel based on a total amount of a metal other than lithium and contains a lithium/nickel complex oxide having a compressive fracture strength of 130 MPa or more, and
   the positive electrode additive contains a lithium-containing metal oxide having an antifluorite structure,
   the lithium-containing metal oxide includes at least one selected from the group consisting of lithium/iron oxide, lithium/copper oxide, and lithium/manganese oxide,
   wherein the lithium/iron oxide includes one or more oxides selected from the group consisting of $Li_3Fe_5O_8$, and $Li_5Fe_5O_8$.

2. The non-aqueous electrolyte secondary battery according to claim 1, wherein a content of the positive electrode additive relative to the positive electrode active material layer is 0.5 mass % or more and 5 mass % or less.

3. The non-aqueous electrolyte secondary battery according to claim 1, wherein the lithium-containing metal oxide further includes $Li_2Fe_3O_5$, $Li_2Fe_3O_4$, $Li_5FeO_4$, $LiFeO_2$, or $LiFe_5O_8$.

4. The non-aqueous electrolyte secondary battery according to claim 1, wherein the positive electrode active material further contains silicon.

5. The non-aqueous electrolyte secondary battery according to claim 4, wherein a content of the silicon is 0.1 mol % or more and 5 mol % or less based on a total amount of a metal other than lithium included in the lithium/nickel complex oxide.

6. The non-aqueous electrolyte secondary battery according to claim 1, wherein the compressive fracture strength of the positive electrode active material is 230 MPa or less.

7. The non-aqueous electrolyte secondary battery according to claim 1, wherein the lithium-containing metal oxide includes at least one selected from the group consisting of lithium/copper oxide and lithium/manganese oxide.

* * * * *